United States Patent
Cho et al.

(10) Patent No.: US 9,655,165 B2
(45) Date of Patent: May 16, 2017

(54) METHOD AND APPARATUS FOR SWITCHING CONNECTION IN WIRELESS COMMUNICATION SYSTEM

(71) Applicant: LG ELECTRONICS INC., Seoul (KR)

(72) Inventors: Heejeong Cho, Seoul (KR); Eunjong Lee, Seoul (KR); Jaehoon Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/406,977

(22) PCT Filed: Jul. 1, 2013

(86) PCT No.: PCT/KR2013/005795
§ 371 (c)(1),
(2) Date: Dec. 10, 2014

(87) PCT Pub. No.: WO2014/007494
PCT Pub. Date: Jan. 9, 2014

(65) Prior Publication Data
US 2015/0124735 A1    May 7, 2015

Related U.S. Application Data

(60) Provisional application No. 61/666,925, filed on Jul. 2, 2012.

(51) Int. Cl.
*H04W 4/00* (2009.01)
*H04W 76/06* (2009.01)
(Continued)

(52) U.S. Cl.
CPC ........... *H04W 76/06* (2013.01); *H04W 4/005* (2013.01); *H04W 72/042* (2013.01);
(Continued)

(58) Field of Classification Search
CPC ... H04W 76/06; H04W 4/005; H04W 72/042; H04W 76/043; H04W 76/064
See application file for complete search history.

(56) References Cited

U.S. PATENT DOCUMENTS

2007/0153747 A1* 7/2007 Pan ....................... H04W 36/14
370/338
2010/0279672 A1   11/2010 Koskela et al.
(Continued)

FOREIGN PATENT DOCUMENTS

| WO | 2004/077920 A2 | 9/2004 |
| WO | 2011/147462 A1 | 12/2011 |
| WO | 2012/048464 A1 | 4/2012 |

*Primary Examiner* — Abdelnabi O Musa
(74) *Attorney, Agent, or Firm* — Dentons US LLP

(57) ABSTRACT

A method and apparatus for switching connection in a wireless communication system is provided. A device receives a base station-to-device (B2D) switch request message or an unsolicited B2D switch response message from a base station. The B2D switch request message or the unsolicited B2D switch response message include information on at least one of a target device, a switch unit, target D2D connection/link identifier(s), an enhanced packet system (EPS) bearer identity, a data radio bearer (DRB) identity, a radio link control (RLC) configuration, a logical channel identity, and when to switch from a device-to-device (D2D) connection to a B2D connection.

3 Claims, 11 Drawing Sheets

(51) Int. Cl.
*H04W 76/04* (2009.01)
*H04W 72/04* (2009.01)

(52) U.S. Cl.
CPC ........ *H04W 76/043* (2013.01); *H04W 76/046* (2013.01); *H04W 76/064* (2013.01)

(56) References Cited

U.S. PATENT DOCUMENTS

| | | | |
|---|---|---|---|
| 2011/0117907 A1* | 5/2011 | Hooli | H04W 72/02 455/422.1 |
| 2011/0306349 A1 | 12/2011 | Hakola et al. | |
| 2012/0051315 A1 | 3/2012 | Wang et al. | |
| 2012/0134344 A1 | 5/2012 | Yu et al. | |
| 2012/0155410 A1 | 6/2012 | Toskala | |
| 2013/0183963 A1* | 7/2013 | Turtinen | H04W 36/0083 455/426.1 |
| 2013/0201954 A1* | 8/2013 | Gao | H04W 72/0413 370/329 |
| 2015/0133083 A1* | 5/2015 | Van Phan | H04L 63/068 455/411 |

* cited by examiner

METHOD AND APPARATUS FOR SWITCHING CONNECTION IN WIRELESS COMMUNICATION SYSTEM

This application is a 35 USC §371 National Stage entry of International Application No. PCT/KR2013/005795 filed on Jul. 1, 2013 and claims priority to U.S. Provisional Application No. 61/666,925, filed Jul. 2, 2012, all of which are incorporated by reference in their entirety herein.

BACKGROUND OF THE INVENTION

Field of the Invention

The present invention relates to wireless communications, and more particularly, to a method and apparatus for switching connection in a wireless communication system.

Related Art

In next generation multimedia mobile communication systems, which have been actively studied in recent years, there is a demand for a system capable of processing and transmitting a variety of information (e.g., video and radio data) in addition to the early-stage voice service. Further, a 3rd generation wireless communication system is followed by a 4th generation wireless communication which is currently being developed aiming at supporting a high-speed data service of 1 gigabits per second (Gbps) in downlink and 500 megabits per second (Mbps) in uplink. The wireless communication system is designed for the purpose of providing reliable communication to a plurality of users irrespective of their locations and mobility. However, a wireless channel has an abnormal characteristic such as a fading phenomenon caused by a path loss, noise, and multipath, an inter-symbol interference (ISI), a Doppler effect caused by mobility of a user equipment, etc. Therefore, various techniques have been developed to overcome the abnormal characteristic of the wireless channel and to increase reliability of wireless communication.

Meanwhile, with the advent of a ubiquitous environment, there is a rapid increase in a demand for receiving a seamless service anytime anywhere by using equipments. In order to satisfy such a demand, a device-to-device (D2D) connection technique may be introduced in a wireless communication system. The D2D connection technique refers to a technique for transmitting and receiving data not via a base station (BS) since devices such as a user equipment (UE) or the like are connected to each other. That is, one device can communicate with another device via the BS, and can directly communicate with another device not via the BS. By using the D2D connection technique, such an effect as low power consumption, throughput enhancement, etc, can be obtained. On the other hand, a conventional connection between the BS and the device may be called a BS-to-device (B2D) connection.

It is required that a method for switching between a D2D connection and a B2D connection efficiently.

SUMMARY OF THE INVENTION

The present invention provides a method and apparatus for switching connection in a wireless communication system. The present invention provides a method for switching from a device-to-device (D2D) connection to a base station-to-device (B2D) connection when a user equipment (UE) is in a radio resource control (RRC) connected state or in an RRC idle state. The present invention also provides a method for switching from a B2D connection to a D2D connection.

In an aspect, a method for switching connection, by a device, in a wireless communication system is provided. The method includes receiving a base station-to-device (B2D) switch request message from a base station. The B2D switch request message includes information on at least one of a target device, a switch unit, target D2D connection/link identifier(s), an enhanced packet system (EPS) bearer identity, a data radio bearer (DRB) identity, a radio link control (RLC) configuration, a logical channel identity, and when to switch from a device-to-device (D2D) connection to a B2D connection. The method includes transmitting a B2D switch response message, to the base station, as a response to the B2D switch request message, and releasing the D2D connection.

In another aspect, a method for switching connection, by a device, in a wireless communication system is provided. The method includes receiving an unsolicited base station-to-device (B2D) switch response message from a base station. The unsolicited B2D switch response message includes information on at least one of a target device, a switch unit, target D2D connection/link identifier(s), an enhanced packet system (EPS) bearer identity, a data radio bearer (DRB) identity, a radio link control (RLC) configuration, a logical channel identity, and when to switch from a device-to-device (D2D) connection to a B2D connection. The method includes releasing the D2D connection.

Switching between a D2D connection and a B2D connection are efficiently controlled.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

Figure 1:
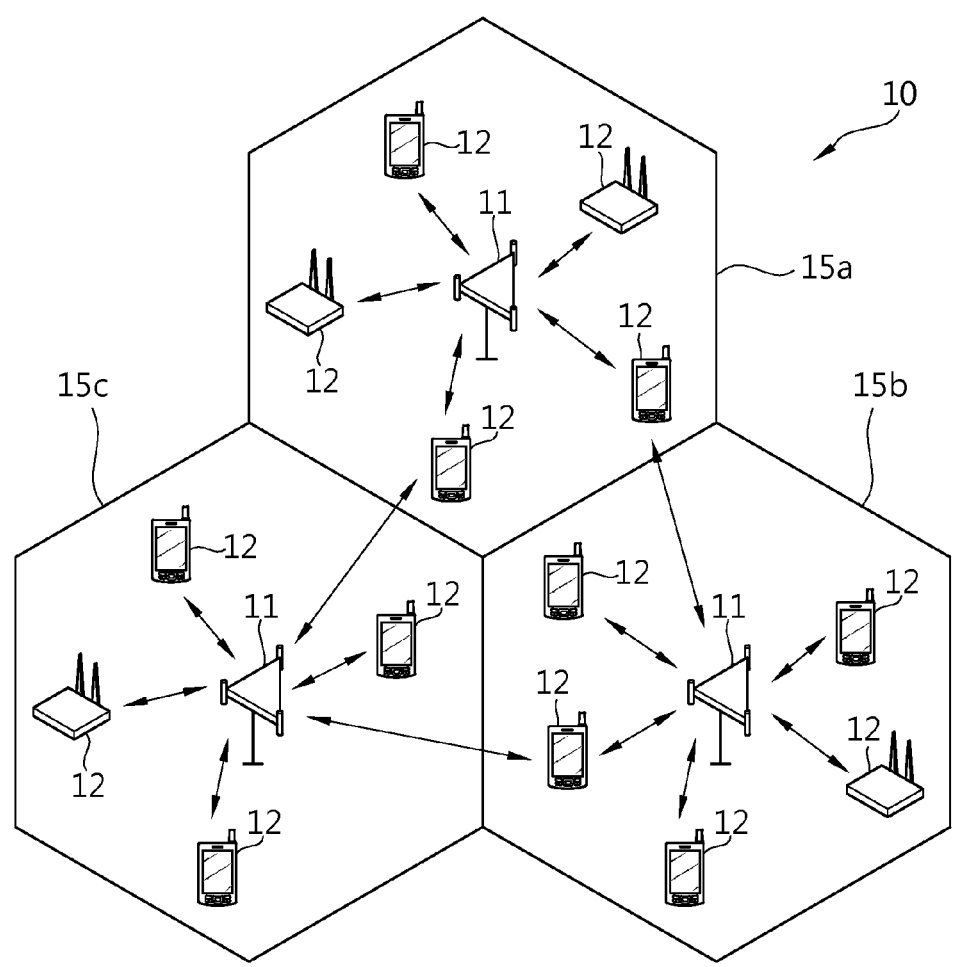
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

A device-to-device (D2D) connection technique can be employed in a wireless communication system. The D2D connection technique refers to a technique for transmitting and receiving data not via a BS since devices such as a UE or the like are connected to each other. There may be various scenarios for establishing the D2D connection.

Figure 2:
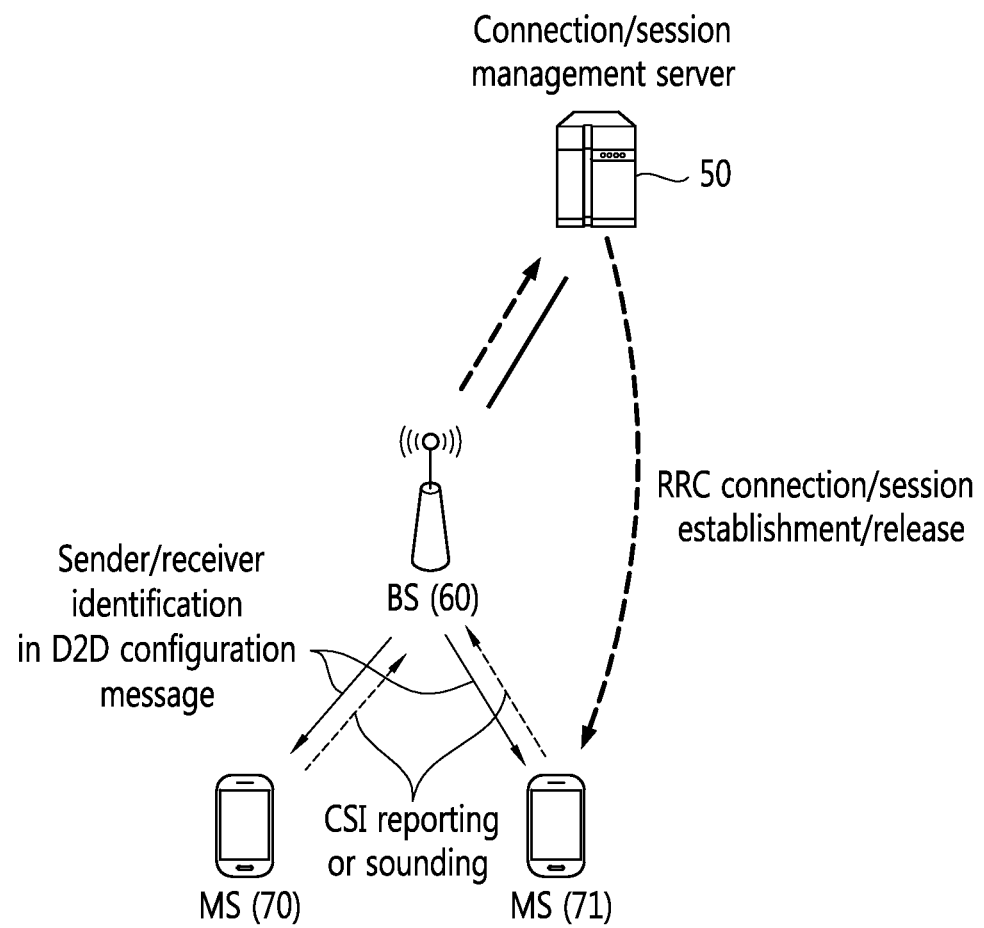
FIG. 2 shows an example of a D2D connection scenario.

FIG. 2 shows an example of a D2D connection scenario.

FIG. 2 shows an example of a network-initiated D2D connection establishment. A network is aware of information on other devices neighboring to a specific device, and the specific device cannot know information on other neighbor devices. Therefore, in this scenario, only the network can initiate the D2D connection establishment, and each device cannot initiate the D2D connection establishment. If an uplink (UL) packet transmitted from each device is received, the network can perform a D2D connection establishment procedure according to a destination of the packet, a location of the destination, or the like. The network can determine whether devices are neighboring to each other by using a location of each device, routing information, etc.

Referring to FIG. 2, each of devices 70 and 71 periodically performs channel state information (CSI) reporting or sounding with respect to a BS 60. The BS 60 can request a D2D connection establishment to each of the devices 70 and 71 by determining a proximity between the devices 70 and 71 by the use of location information of the devices 70 and 71, a presence of data to be transmitted between the devices 70 and 71, a preference for a D2D connection of each of the devices 70 and 71, etc. The network and each of the devices 70 and 71 can pre-negotiate about whether a D2D connection is preferred or a base station to device (B2D) connection is preferred according to an application type or a data characteristic.

The BS 60 transmits a D2D configuration message to each of the devices 70 and 71 to establish the D2D connection. In this case, the D2D configuration message may include an identifier of each of the devices 70 and 71. If the D2D connection is established, the BS 60 reports this to a connection/session management server 50, and the connection/session management server 50 instructs each of the devices 70 and 71 to establish/release a radio resource control (RRC) connection/session.

Figure 3:
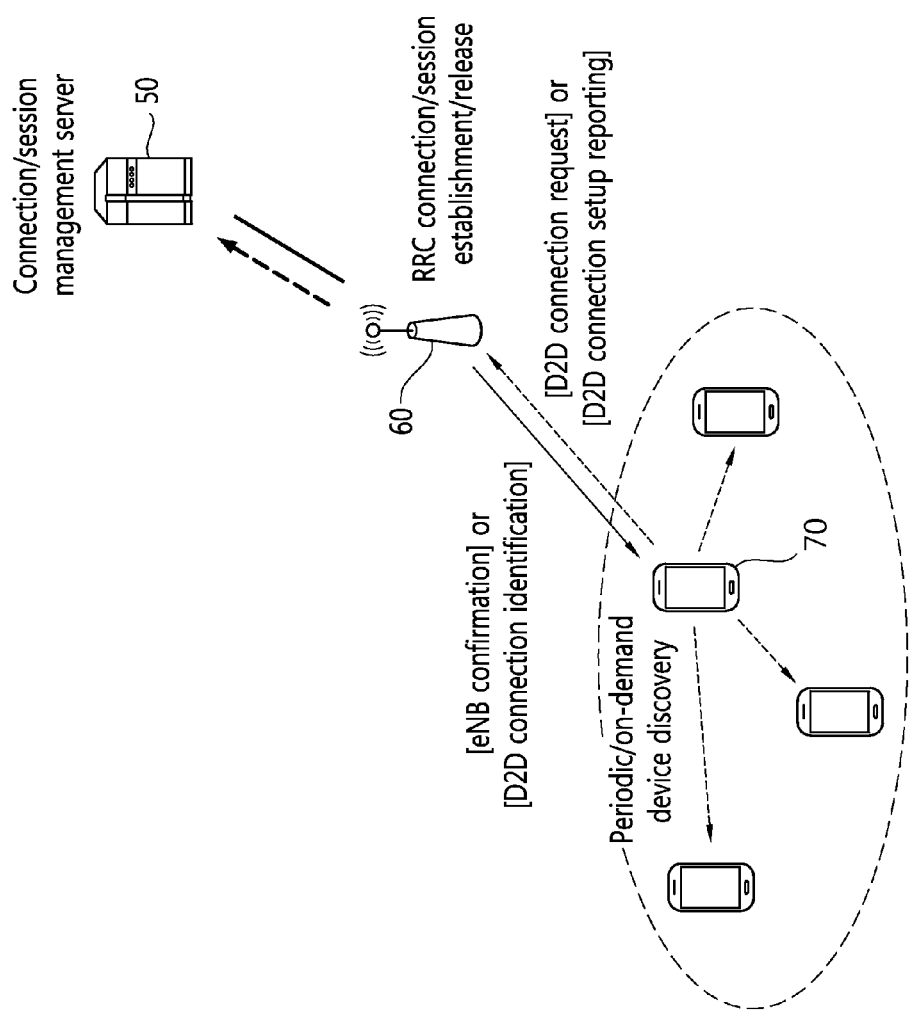
FIG. 3 shows another example of a D2D connection scenario.

FIG. 3 shows another example of a D2D connection scenario.

It is assumed in FIG. 3 that only a specific device knows information on neighbor devices of the specific device. The specific device may use a neighbor discovery procedure to know information on neighbor devices or to determine proximity between devices. The network cannot know the information on neighbor devices of the specific device. In such a scenario, a D2D connection establishment can be initiated only by the specific device, and cannot be initiated by the network. Upon receiving a UL packet transmitted from each device, the network can perform the D2D connection establishment procedure.

Referring to FIG. 3, a device 70 can perform the neighbor discovery procedure either periodically or on demand of a BS. The device 70 can transmit a D2D connection request or D2D connection setup reporting to the BS 60 on the basis of information regarding neighbor devices and acquired through the neighbor discovery procedure. Upon receiving the D2D connection request or the D2D connection setup reporting, the BS 60 can transmit an eNB confirmation or a D2D connection identification to the device 70. Accordingly, the D2D connection can be established. The BS 60 can instruct a connection/session management server 50 to establish/release an RRC connection/session.

Figure 4:
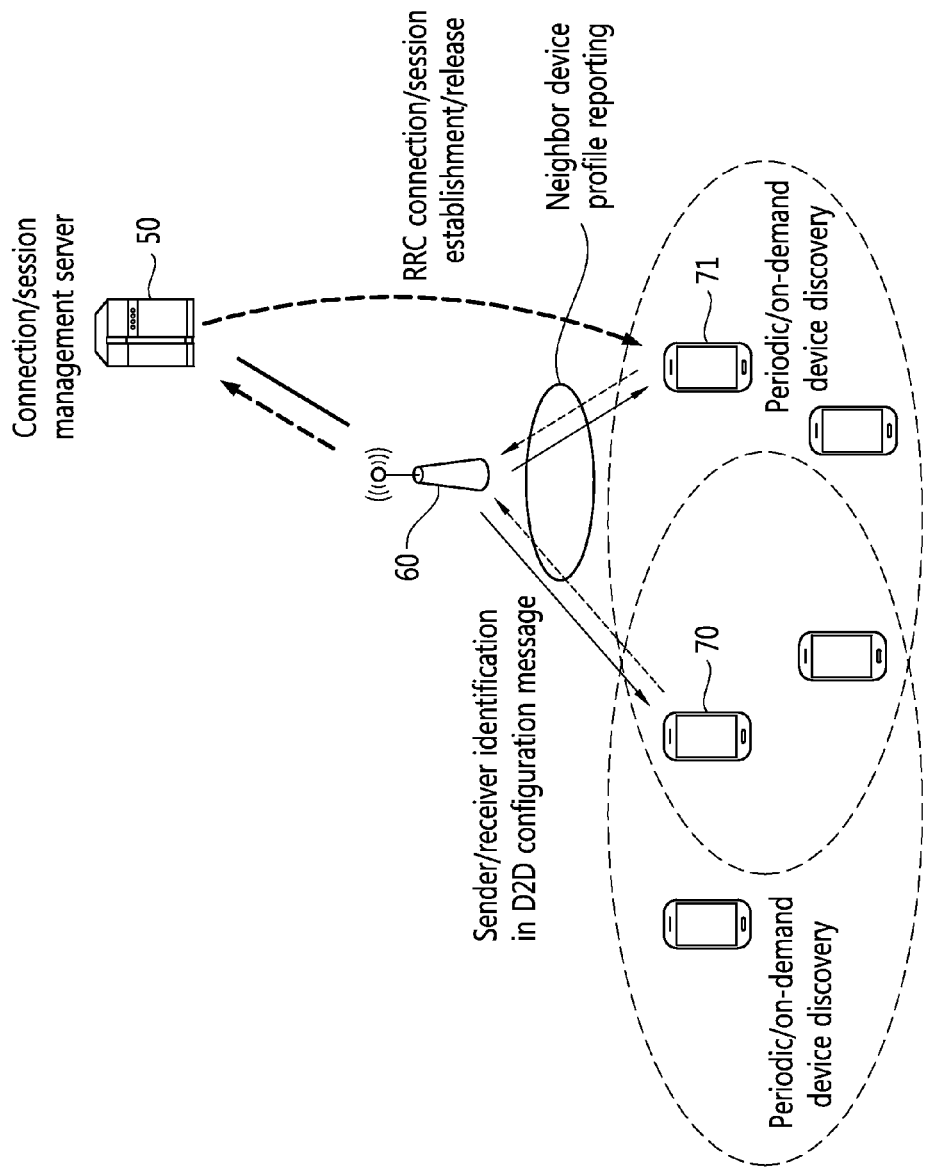
FIG. 4 shows another example of a D2D connection scenario.

FIG. 4 shows another example of a D2D connection scenario.

It is assumed in FIG. 4 that information on neighbor devices of a specific device is known to both a network and the specific device. In such a scenario, a D2D connection establishment can be initiated by both the network and the specific device. Upon receiving a UL packet transmitted from each device, the network can perform a D2D connection establishment procedure. The network can use each device's location and routing information or use neighbor devices' profiles reported by each device to determine proximity between the devices. Alternatively, each device can use information regarding neighbor devices and reported by the network or use a neighbor discovery procedure to determine the proximity between the devices.

Referring to FIG. 4, each of devices 70 and 71 can perform the neighbor discovery procedure either periodically or on demand of a BS. Each of the devices 70 and 71 can report neighbor devices' profiles acquired through the neighbor discovery procedure to a BS 60. In addition, when each of the devices 70 and 71 reports the neighbor devices' profiles to the BS 60, each of the devices 70 and 71 additionally can perform sounding or report CSI periodically.

The BS 60 transmits a D2D configuration message to each of the devices 70 and 71 to establish the D2D connection. In this case, the D2D configuration message may include an identifier of each of the devices 70 and 71. If the D2D connection is established, the BS 60 reports this to a connection/session management server 50, and the connection/session management server 50 instructs each of the devices 70 and 71 to establish/release an RRC connection/session.

A method for controlling of switching between a D2D connection and a B2D connection according to embodiments of the present invention is described below. A BS and devices may determine switching between the B2D connection and the D2D connection, on which user data is transmitted and/or received, based on distance between the devices, signal quality, amount of interference, amount of a network load, whether to guarantee quality of service (Qos), etc.

There are two scenarios for controlling of switching between the D2D connection and the B2D connection according to embodiments of the present invention. Scenario A is that all control signals, such as a resource grant, etc, related to the D2D connection are controlled (or transmitted) by the BS. In the scenario A, a state between the BS and the device may be only RRC-connected state (in case of 3GPP)/ active state (in case of 3GPP2). Scenario B is that control signals related to the D2D connection are transmitted through the D2D connection. In the scenario B, a state between the BS and the device may be RRC-connected state (in case of 3GPP)/active state (in case of 3GPP2) or RRC-idle state (in case of 3GPP)/idle state (in case of 3GPP2).

Table 1 shows two scenarios for controlling of switching between the D2D connection and the B2D connection, corresponding state of the device and corresponding switching procedure.

TABLE 1

| Scenario | | RRC-connected | RRC-idle | Switching procedure |
|---|---|---|---|---|
| Case 1: D2D→B2D | A | ◯ | X | RRC-connected |
| | B | ◯ | ◯ | i) B2D & D2D connection mapping |

TABLE 1-continued

| Scenario | | RRC-connected | RRC-idle | Switching procedure |
|---|---|---|---|---|
| | | | | ii) D2D connection release RRC-idle i) Paging ii) B2D connection establishment iii) B2D & D2D connection mapping iv) D2D connection release |
| Case 2: B2D→D2D | A | ◯ | X | RRC-connected i) D2D connection establishment ii) B2D & D2D connection mapping iii) B2D connection release |
| | B | ◯ | X | |

Referring Table 1, as described above, the scenario A only corresponds to the RRC-connected state. The scenario B may correspond to the RRC-connected state or the RRC-idle state when switching from the D2D connection to the B2D connection is performed.

The switching procedure from the D2D connection to the B2D connection in the RRC-connected state may include B2D & D2D connection mapping and D2D connection release. The D2D connection release may be applied by different units according to a switching unit/switching service type. For example, the switching from the D2D connection to the B2D connection may be performed per flow, or per bearer, or may be performed to all flows. Accordingly, the D2D connection release may be applied per flow if the switching from the D2D connection to the B2D connection is performed per flow.

The switching procedure from the D2D connection to the B2D connection in the RRC-idle state may include paging, B2D connection establishment, B2D & D2D connection mapping and D2D connection release. The paging may be included only in BS-initiated switching procedure. Also, the D2D connection release may be applied by different units according to the switching unit/switching service type.

The switching procedure from the B2D connection to the D2D connection may include D2D connection establishment, B2D & D2D connection mapping and B2D connection release. The D2D connection establishment may be applied by different units according to the switching unit/ switching service type. Also, the B2D connection release may be a part of an RRC connection release & detach procedure (in case of 3GPP)/deregistration procedure (in case of 3GPP2) or may be a part of an RRC reconfiguration procedure (in case of 3GPP)/dynamic service change or deletion procedure (in case of 3GPP2) according to the switching unit (per flow, per bearer, all flows) and presence of retained flow (RB/logical channel).

All devices which are joined or are to be joined in the D2D connection (e.g., sender/receiver) should perform the switching procedure described above. Meanwhile, it is assumed that if there is no other active connection except the D2D connection, the connection between the BS and the device may be switched to the idle state.

A switching procedure from a D2D connection to a B2D connection when a BS and devices are in an RRC-connected state is described in detail.

For this procedure, the BS and the devices may perform a B2D & D2D connection mapping operation and a D2D connection release operation. The B2D & D2D connection mapping operation and the D2D connection release operation may be performed by one message (e.g., a B2D switch request message) sequentially, or may be performed by different messages respectively (e.g., a B2D connection mapping request message, a D2D connection release request message)

The B2D & D2D connection mapping operation may determine information on when to switch from the D2D connection to the B2D connection, a radio resource configuration for the B2D connection, etc. That is, the B2D & D2D connection mapping operation may map parameters between the D2D connection and the B2D connection. If radio bearers (RBs) need to be additionally generated or modified, the BS may perform the RRC connection reconfiguration procedure. The D2D connection release operation may determine the switching unit (e.g., per flow, per bearer, all flows) and switched connection.

Figure 5:
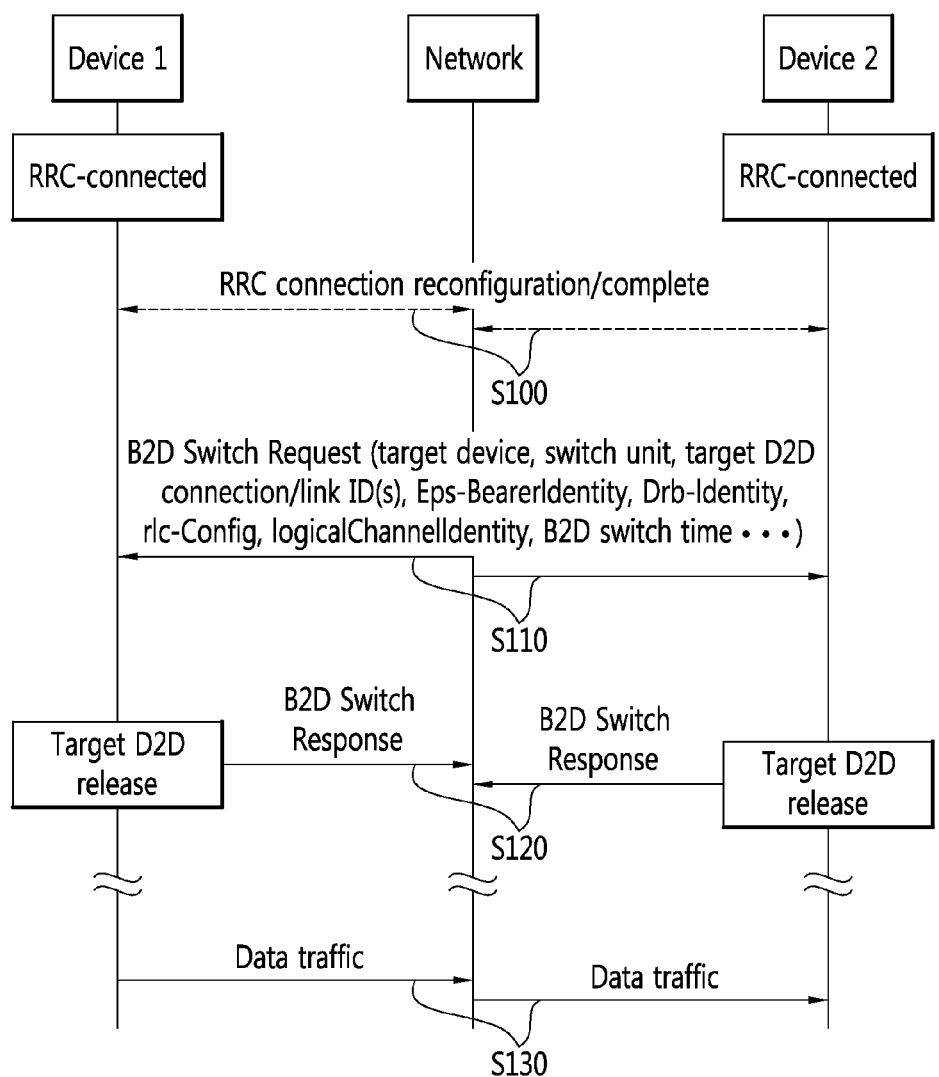
FIG. 5 shows an example of a method for switching from a D2D connection to a B2D connection according to an embodiment of the present invention.

FIG. 5 shows an example of a method for switching from a D2D connection to a B2D connection according to an embodiment of the present invention. In FIG. 5, a network requests to devices to switch from the D2D connection to the B2D connection.

Device 1 and device 2 are in the RRC-connected state. If new channels are needed, at step S100, the network and the devices 1/2 may perform an RRC connection reconfiguration/complete procedure.

At step S110, the network transmits a B2D switch request message to the device 1 and device 2. The B2D switch request message may include information on at least one of a target device, a switch unit, target D2D connection/link ID(s), an EPS-bearer identity (Eps-BearerIdentity), a DRB identity (Drb-Identity), an RLC configuration (rlc-Config), a logical channel identity (logicalChannelIdentity), and B2D switch time, etc.

On receiving the B2D switch request message from the network, the device 1 and device 2 release the D2D connection, and at step S120, transmit a B2D switch response message to the network.

Accordingly, the device 1 and device 2 are now connected through the B2D connection. At step S130, the device 1 transmits data traffic to the network, and the network delivers the data traffic to the device 2.

Figure 6:
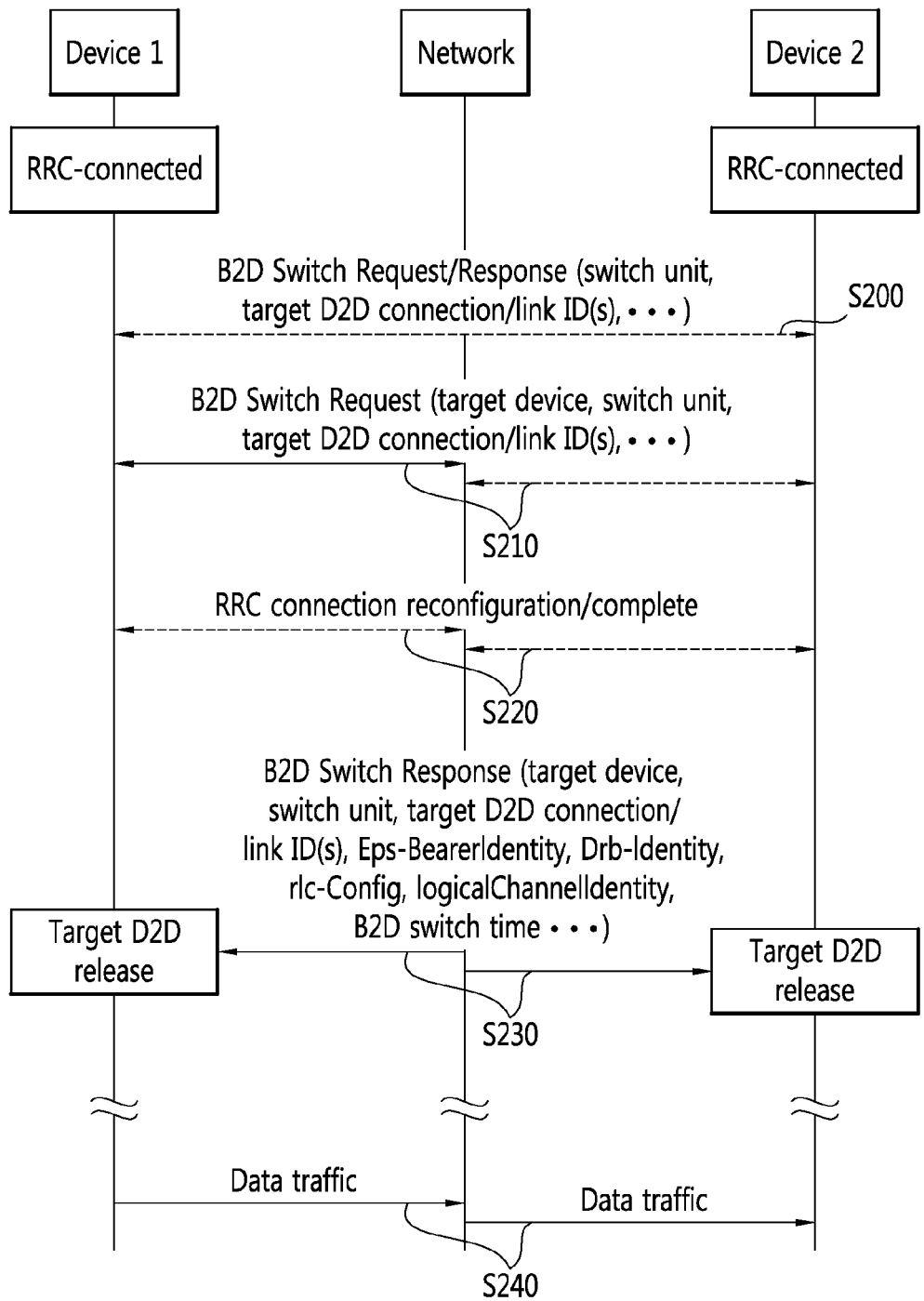
FIG. 6 shows another example of a method for switching from a D2D connection to a B2D connection according to an embodiment of the present invention.

FIG. 6 shows another example of a method for switching from a D2D connection to a B2D connection according to an embodiment of the present invention. In FIG. 6, at least one of devices requests to a network to switch from the D2D connection to the B2D connection.

Device 1 and device 2 are in the RRC-connected state. At step S200, the device 1 and device 2 may exchange a B2D switch request message and a B2D switch response message each other before requesting to the network. The B2D switch request/response messages may include information on at least one of a target device, a switch unit, target D2D connection/link ID(s).

At step S210, at least one of the device 1 and device 2 transmits a B2D switch request message to the network. In FIG. 6, it is assumed that the device 1 transmits the B2D switch request message. The B2D switch request message may include information on at least one of a target device, a switch unit, target D2D connection/link ID(s).

If new channels are needed, at step S220, the network and the devices 1/2 may perform an RRC connection reconfiguration/complete procedure.

At step S230, the network transmits an unsolicited B2D switch response message to the device 1 and device 2. The unsolicited B2D switch response message may include information on at least one of a target device, a switch unit, target D2D connection/link ID(s), an EPS-bearer identity (Eps-BearerIdentity), a DRB identity (Drb-Identity), an RLC configuration (rlc-Config), a logical channel identity (logicalChannelIdentity), and B2D switch time, etc.

On receiving the unsolicited B2D switch response message from the network, the device 1 and device 2 release the D2D connection.

Accordingly, the device 1 and device 2 are now connected through the B2D connection. At step S240, the device 1 transmits data traffic to the network, and the network delivers the data traffic to the device 2.

A switching procedure from a D2D connection to a B2D connection when a BS and devices are in an RRC-idle state is described in detail.

For this procedure, the BS and the devices may perform a paging operation (only if a BS initiates the switching procedure), a B2D connection establishment operation (i.e., RRC connection establishment), a B2D & D2D connection mapping operation and a D2D connection release operation. The BS wakes up the devices when the BS wants to switch from the D2D connection to the B2D connection. The B2D & D2D connection mapping operation and the D2D connection release operation are the same as the switching procedure from the D2D connection to the B2D connection when the BS and the devices are in RRC-connected state.

Figure 7:
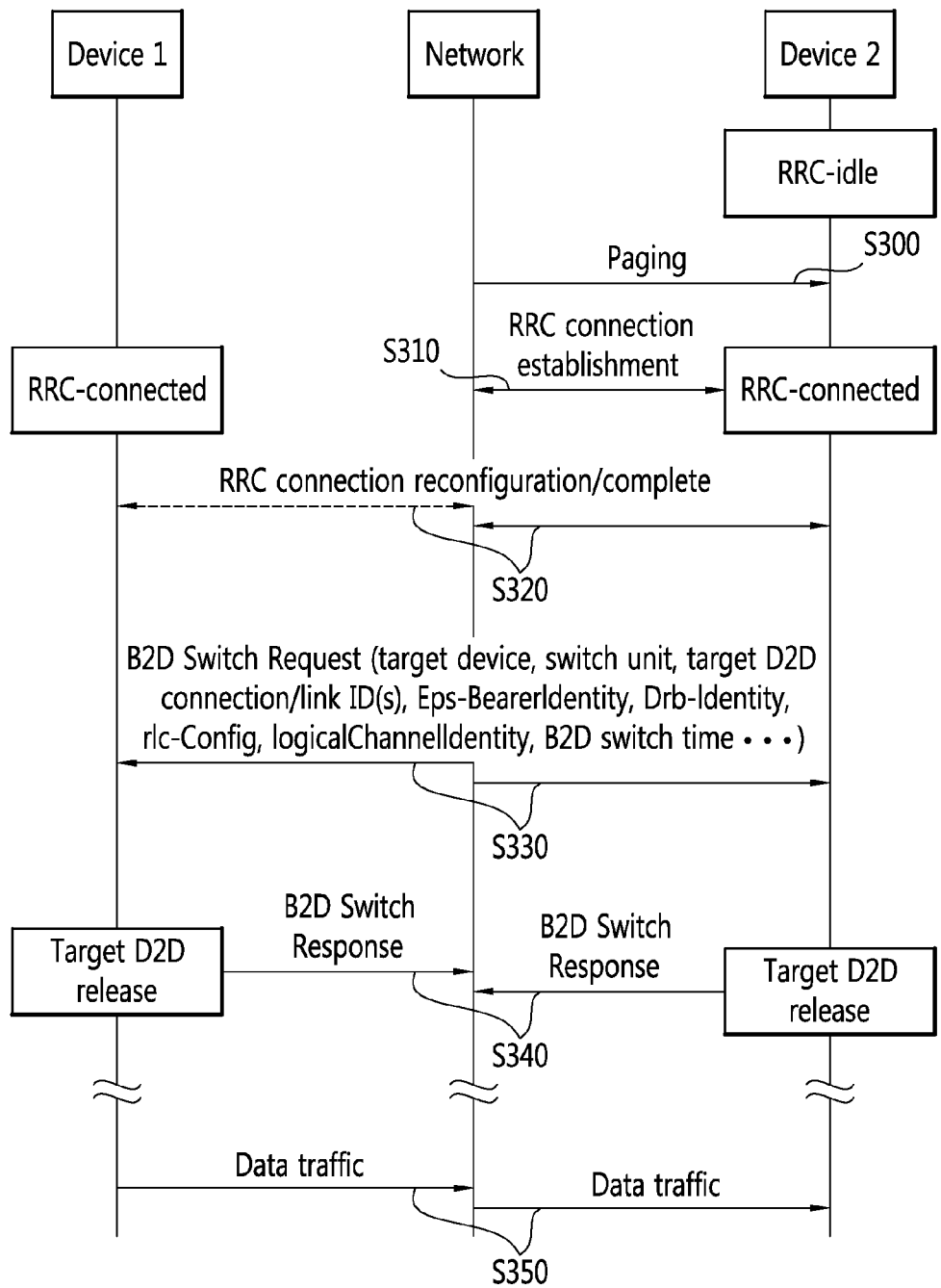
FIG. 7 shows another example of a method for switching from a D2D connection to a B2D connection according to an embodiment of the present invention.

FIG. 7 shows another example of a method for switching from a D2D connection to a B2D connection according to an embodiment of the present invention. In FIG. 7, a network requests to devices to switch from the D2D connection to the B2D connection.

Device 2 is in the RRC-idle state. At step S300, the network transmits a paging message to the device 2 to wake up the device 2. At step S310, the network and the device 2 perform an RRC connection establishment procedure, and the device 2 transits to the RRC-connected state. At step S320, the network and the device 2 perform an RRC connection reconfiguration/complete procedure.

At step S330, the network transmits a B2D switch request message to the device 1 and device 2. The B2D switch request message may include information on at least one of a target device, a switch unit, target D2D connection/link ID(s), an EPS-bearer identity (Eps-BearerIdentity), a DRB identity (Drb-Identity), an RLC configuration (rlc-Config), a logical channel identity (logicalChannelIdentity), and B2D switch time, etc.

On receiving the B2D switch request message from the network, the device 1 and device 2 release the D2D connection, and at step S340, transmit a B2D switch response message to the network.

Accordingly, the device 1 and device 2 are now connected through the B2D connection. At step S350, the device 1 transmits data traffic to the network, and the network delivers the data traffic to the device 2.

A switching procedure from a B2D connection to a D2D connection is described in detail.

For this procedure, the BS and the devices may perform a D2D connection establishment operation, a B2D & D2D connection mapping operation and optionally a B2D connection release operation. The operations described above may be performed by one message (e.g., a D2D switch request message) sequentially, or may be performed by different messages respectively (e.g., a D2D connection establishment message, a D2D connection mapping request message, a B2D connection release request message).

The B2D & D2D connection mapping operation may determine information on when to switch from the B2D connection to the D2D connection, a radio resource configuration for the D2D connection, etc. The B2D connection release may be a part of an RRC connection release & detach procedure (in case of 3GPP)/deregistration procedure (in case of 3GPP2) or may be a part of an RRC reconfiguration procedure (in case of 3GPP)/dynamic service change or deletion procedure (in case of 3GPP2) according to the switching unit (per flow, per bearer, all flows) and presence of retained flow.

Figure 8:
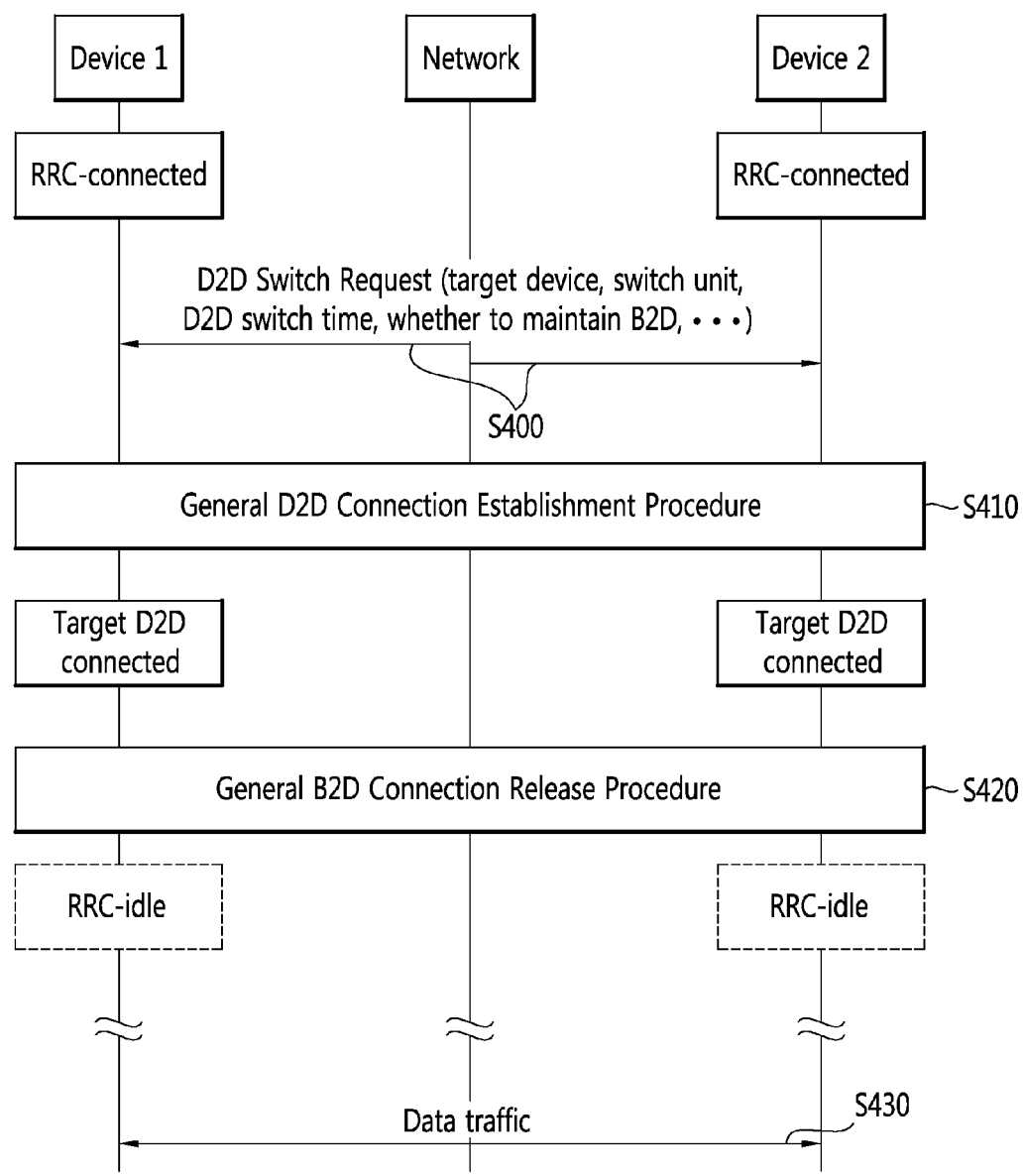
FIG. 8 shows an example of a method for switching from a B2D connection to a D2D connection according to an embodiment of the present invention.

FIG. 8 shows an example of a method for switching from a B2D connection to a D2D connection according to an embodiment of the present invention.

Device 1 and device 2 are in an RRC-connected state. At step S400, a network transmits a D2D switch request message to the device 1 and device 2. The D2D switch request message may include information on at least one of a target device, a switch unit, D2D switch time, and whether to maintain the B2D connection, etc.

At step S410, the device 1 and the device 2 perform a general D2D connection establishment procedure. At step S420, the device 1 and the device 2 perform a general B2D connection release procedure. The device 1 and device 2 may transit to an RRC-idle state.

Accordingly, the device 1 and device 2 are now connected through the D2D connection. At step S430, the device 1 and device 2 exchange data traffic each other directly, not via the network.

Figure 9:
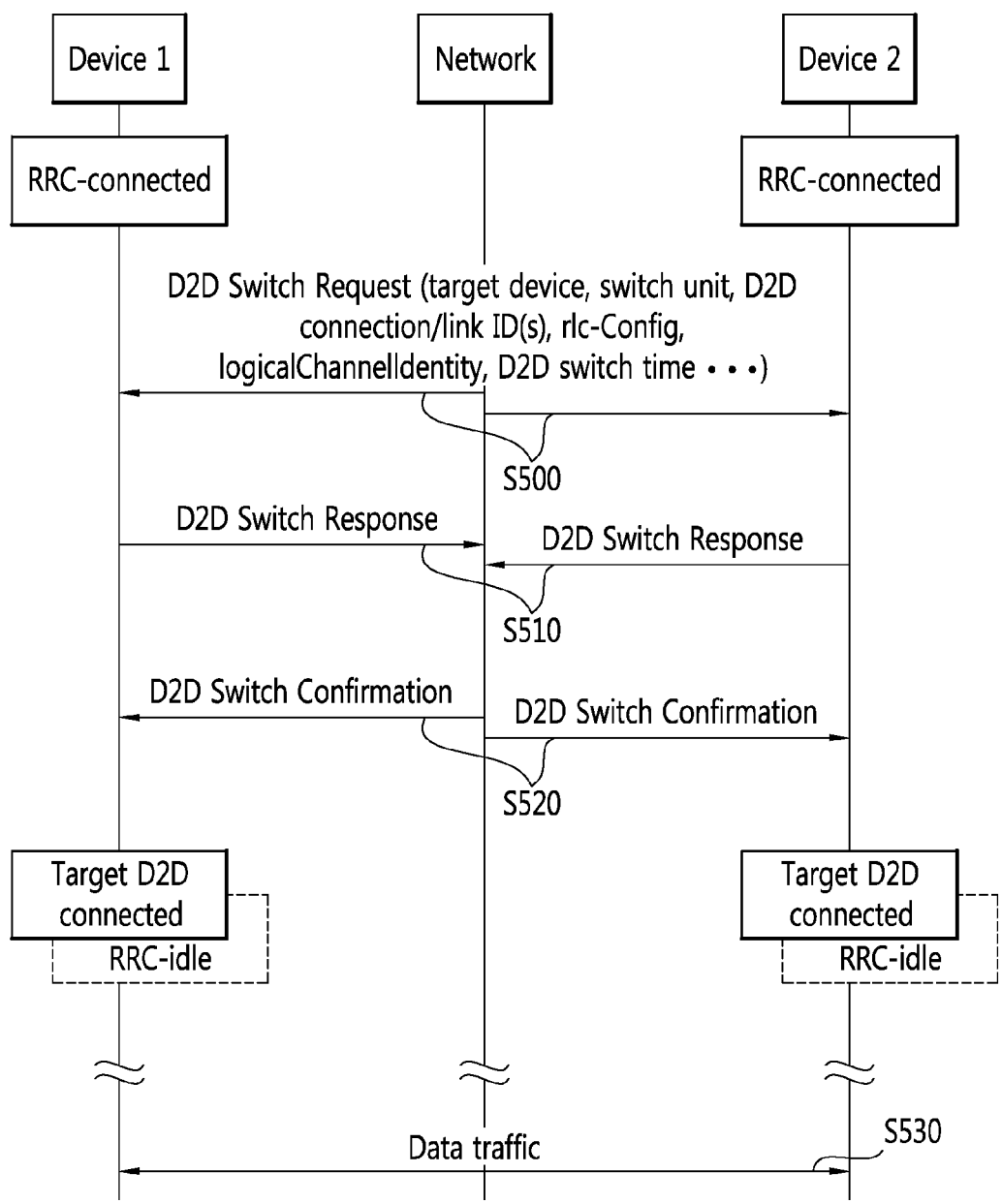
FIG. 9 shows another example of a method for switching from a B2D connection to a D2D connection according to an embodiment of the present invention.

FIG. 9 shows another example of a method for switching from a B2D connection to a D2D connection according to an embodiment of the present invention.

Device 1 and device 2 are in an RRC-connected state. At step S500, a network transmits a D2D switch request message to the device 1 and device 2. The D2D switch request message may include information on at least one of a target device, a switch unit, D2D connection/link ID(s), an RLC configuration (rlc-Config), a logical channel identity (logicalChannelIdentity), and D2D switch time, etc.

On receiving the D2D switch request message from the network, at step S510, the device 1 and device 2 transmits a D2D switch response message to the network. On receiving the D2D switch response message from the device 1 and device 2, at step S520, the network transmits a D2D switch confirmation message to the device 1 and device 2. The device 1 and device 2 may transit to an RRC-idle state.

Accordingly, the device 1 and device 2 are now connected through the D2D connection. At step S530, the device 1 and device 2 exchange data traffic each other directly, not via the network.

Figure 10:
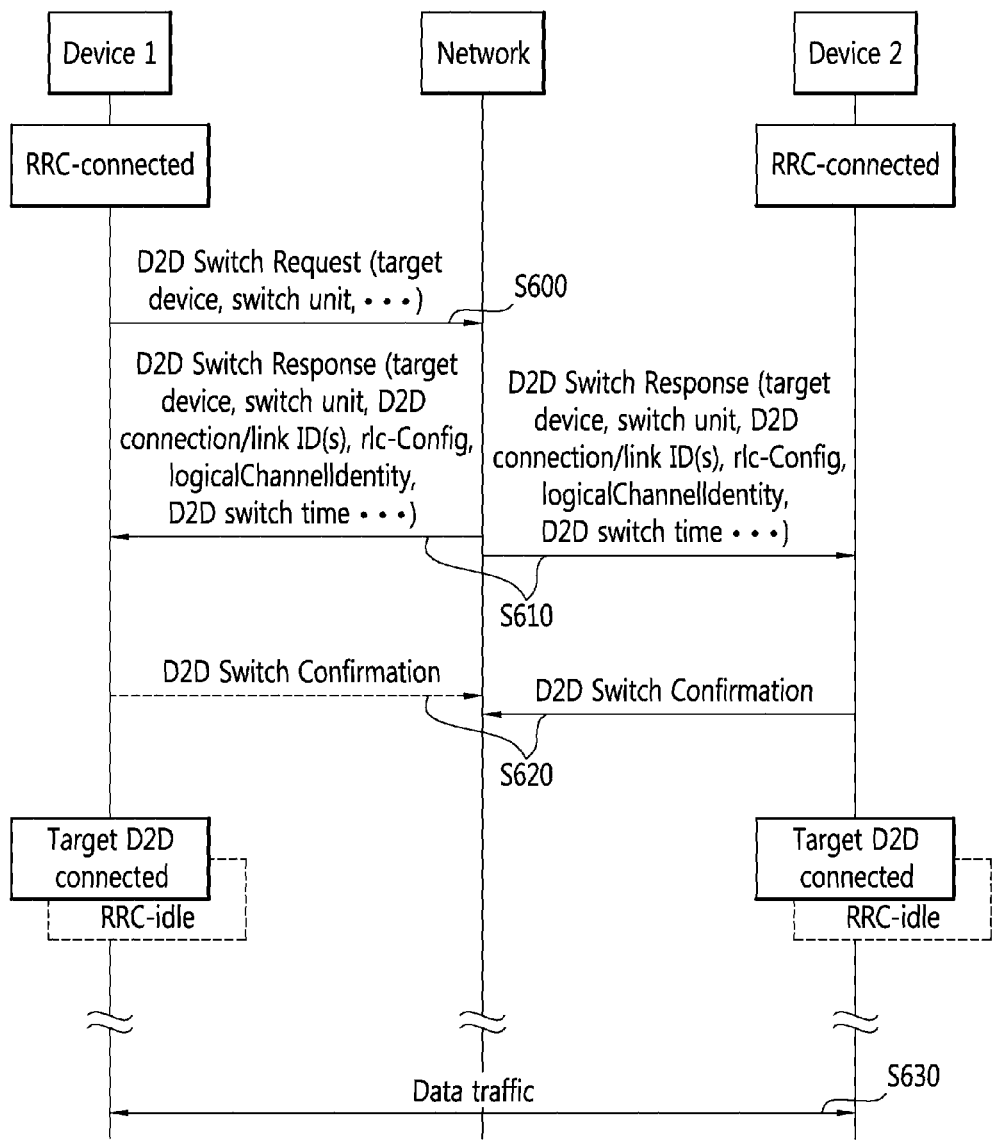
FIG. 10 shows another example of a method for switching from a B2D connection to a D2D connection according to an embodiment of the present invention.

FIG. 10 shows another example of a method for switching from a B2D connection to a D2D connection according to an embodiment of the present invention.

Device 1 and device 2 are in an RRC-connected state. At step S600, the device 1 transmits a D2D switch request message to a network. The D2D switch request message may include information on at least one of a target device, a switch unit, etc.

At step S610, the network transmits a D2D switch response message to the device 1 and device 2. The D2D switch response message may include information on at least one of a target device, a switch unit, D2D connection/link ID(s), an RLC configuration (rlc-Config), a logical channel identity (logicalChannelIdentity), and D2D switch time, etc.

On receiving the D2D switch response message from the network, at step S620, the device 1 and device 2 may transmit a D2D switch confirmation message to the network. The device 1, which transmits the D2D switch request message at step S600, may not transmit the D2D switch confirmation message. The device 1 and device 2 may transit to an RRC-idle state.

Accordingly, the device 1 and device 2 are now connected through the D2D connection. At step S630, the device 1 and device 2 exchange data traffic each other directly, not via the network.

Figure 11:
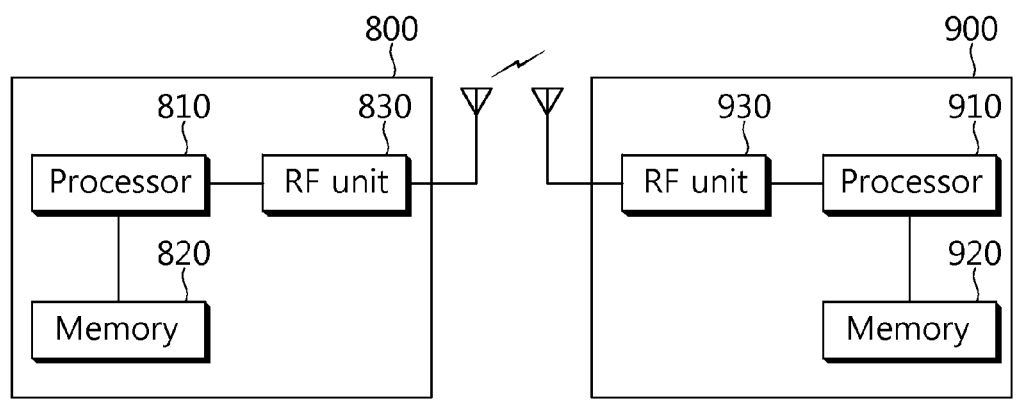
FIG. 11 is a block diagram showing wireless communication system to implement an embodiment of the present invention.

FIG. 11 is a block diagram showing wireless communication system to implement an embodiment of the present invention.

A base station 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A device 900 includes a processor 910, a memory 920 and an RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for switching from a device-to-device (D2D) connection to a base station-to-device (B2D) connection, by a first device, in a wireless communication system, the method comprising:

transmitting first data traffic to a second device through the D2D connection, wherein the first device is in a radio resource control (RRC) idle state, wherein the second device is in a RRC connected state;

receiving a B2D switch request message from a base station, wherein the B2D switch request message includes information on the second device, a switch unit, D2D connection/link identifier(s) of the second device, an enhanced packet system (EPS) bearer identity, a data radio bearer (DRB) identity, a radio link control (RLC) configuration, a logical channel identity, and a B2D switch time identifying when the first device is to switch from the D2D connection to a B2D connection;

transmitting a B2D switch response message, to the base station, as a response to the B2D switch request message;

releasing the D2D connection, wherein, according to the switch unit, the D2D connection is released per flow, per bearer, or for all flows; and transmitting second data traffic to the base station, which delivers the second data traffic to the second device.

2. The method of claim 1, further comprising:
receiving a paging message from the base station; and
performing an RRC connection establishment procedure with the base station.

3. The method of claim 1, further comprising performing an RRC connection reconfiguration procedure with the base station.

\* \* \* \* \*